United States Patent
Watanabe et al.

(10) Patent No.: US 11,508,074 B2
(45) Date of Patent: Nov. 22, 2022

(54) SENSOR DATA GENERATING DEVICE

(71) Applicant: KOITO MANUFACTURING CO., LTD., Tokyo (JP)

(72) Inventors: Shigeyuki Watanabe, Shizuoka (JP); Yuichi Watano, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 133 days.

(21) Appl. No.: 16/411,743

(22) Filed: May 14, 2019

(65) Prior Publication Data

US 2019/0355133 A1 Nov. 21, 2019

(30) Foreign Application Priority Data

May 17, 2018 (JP) .............................. JP2018-095396

(51) Int. Cl.
| | |
|---|---|
| *G06T 7/246* | (2017.01) |
| *G08G 1/16* | (2006.01) |
| *G01S 7/481* | (2006.01) |
| *H04N 5/225* | (2006.01) |

(52) U.S. Cl.
CPC .............. *G06T 7/248* (2017.01); *G08G 1/166* (2013.01); *G01S 7/4811* (2013.01); *G06T 2207/30252* (2013.01); *H04N 5/2253* (2013.01)

(58) Field of Classification Search
CPC .. G08G 1/166; G08G 1/161; G08G 1/096708; H04W 4/021; H04W 4/38; H04W 4/40; H04N 5/2253; H04N 5/2257; G06T 2207/30252; G06T 7/248; G01S 17/931; G01S 7/4811

See application file for complete search history.

(56) References Cited

U.S. PATENT DOCUMENTS

| | | | | |
|---|---|---|---|---|
| 2009/0262188 | A1* | 10/2009 | Hoki | ...................... G06V 10/25 |
| | | | | 348/140 |
| 2014/0226015 | A1 | 8/2014 | Takatsudo et al. | |
| 2014/0300744 | A1 | 10/2014 | Kasahara | |
| 2015/0145997 | A1 | 5/2015 | Terashima | |

(Continued)

FOREIGN PATENT DOCUMENTS

| | | |
|---|---|---|
| CN | 103797530 A | 5/2014 |
| CN | 104041008 A | 9/2014 |

(Continued)

OTHER PUBLICATIONS

Office Action dated Jul. 3, 2020 issued by the State Intellectual Property of P.R. China in Application No. 20190396966.4.

(Continued)

*Primary Examiner* — Amara Abdi
(74) *Attorney, Agent, or Firm* — Sughrue Mion, PLLC

(57) ABSTRACT

An input interface is configured to receive at least one sensor signal corresponding to information of the exterior of the vehicle sensed by at least one sensor. A processor is configured to, based on the sensor signal, generate: a first data corresponding to first information sensed in a first area; and a second data corresponding to second information sensed in a second area located outside the first area. An output interface is configured to output the first data and the second data independently from one another.

2 Claims, 7 Drawing Sheets

(56) References Cited

U.S. PATENT DOCUMENTS

| | | | |
|---|---|---|---|
| 2015/0341620 A1* | 11/2015 | Han | H04N 13/271 |
| | | | 701/99 |
| 2016/0078305 A1* | 3/2016 | Higgins-Luthman | B60R 1/00 |
| | | | 348/118 |
| 2019/0052843 A1 | 2/2019 | Izumi et al. | |
| 2019/0126826 A1* | 5/2019 | Jerot | G06T 3/4038 |
| 2019/0259281 A1* | 8/2019 | Martin | G08G 1/056 |
| 2020/0074159 A1* | 3/2020 | Ohnishi | G06V 40/103 |

FOREIGN PATENT DOCUMENTS

| | | |
|---|---|---|
| CN | 104660980 A | 5/2015 |
| FR | 3 052 252 A1 | 12/2017 |
| JP | 10-105863 A | 4/1998 |
| JP | 2007-89082 A | 4/2007 |
| JP | 2017-034615 A | 2/2017 |
| JP | 2017-210102 A | 11/2017 |

OTHER PUBLICATIONS

Office Action dated Aug. 18, 2020 by the Intellectual Property Office of France in counterpart French Patent Application No. 1905136.

Office Action dated Apr. 5, 2022 by the Japanese Patent Office in counterpart Japanese Patent Application No. 2018-095396.

* cited by examiner

SENSOR DATA GENERATING DEVICE

TECHNICAL FIELD

The present invention relates to a sensor data generating device adapted to be mounted on a vehicle.

BACKGROUND ART

Patent Document 1 discloses a camera adapted to be mounted on a vehicle. The camera serves as an example of a sensor. An image of the exterior of the vehicle acquired by the camera is used for driving assistance technology.

In the configuration described in Patent Document 1, a part of an image acquired by the camera is extracted and is used to be displayed on a display device installed in a compartment of the vehicle.

PRIOR ART DOCUMENT

Patent Document

Patent Document 1: Japanese Patent Publication No. 2017-034615A

SUMMARY

The presently disclosed subject matter is intended to utilize information acquired by a sensor mounted on a vehicle in a more efficient manner.

In order to meet the demand described above, an illustrative aspect of the presently disclosed subject matter provides a sensor data generating device adapted to be mounted on a vehicle, comprising:
  an input interface configured to receive at least one sensor signal corresponding to information of the exterior of the vehicle sensed by at least one sensor;
  a processor configured to, based on the sensor signal, generate: a first data corresponding to first information sensed in a first area; and a second data corresponding to second information sensed in a second area located outside the first area; and
  an output interface configured to output the first data and the second data independently from one another.

It can be said that the first information sensed in the first area has higher necessity as information used for driving assistance than the second sensed in the second area located outside the first area. Not only the first data corresponding to such first information but also the second data corresponding to the second information that can be sensed by the sensor but the necessity thereof is relatively low can be outputted as required, whereby the information acquired by the sensor mounted on the vehicle can be utilized in a more effective manner while suppressing load related to data communication.

In order to meet the demand described above, an illustrative aspect of the presently disclosed subject matter provides a sensor data generating device adapted to be mounted on a vehicle, comprising:
  an input interface configured to receive at least one sensor signal corresponding to information of the exterior of the vehicle sensed by at least one sensor,
  a processor configured to, based on the sensor signal, generate: a first data corresponding to first information sensed in a first area including a sensing reference position of the sensor; and a second data corresponding to second information sensed in a second area not including the sensing reference position; and
  an output interface configured to output the first data and the second data independently from one another.

It can be said that the first information sensed in the first area including the sensing reference position of the sensor has higher necessity as information used for driving assistance than the second information sensed in the second area not including the sensing reference position of the sensor. Not only the first data corresponding to such first information but also the second data corresponding to the second information that can be sensed by the sensor but the necessity thereof is relatively low can be outputted as required, whereby the information acquired by the sensor mounted on the vehicle can be utilized in a more effective manner while suppressing load related to data communication.

Each of the above sensor data generating device may be configured such that the processor is configured to generate the second data so as to include information related to at least one of recognition processing, determination processing, and analysis processing performed with respect to the second information.

That is, the sensor data generating device does not perform at least one of the recognition processing, the determination processing, and the analysis processing with respect to the first data, and prioritizes the promptness to an entity to which the processing based on the first data having higher necessity is entrusted. By narrowing down the object of the above processing to the second information, it is possible to provide information that can supplement the processing performed in that entity while suppressing an increase in the processing load of the processor.

In this case, each of the above sensor data generating device may be configured such that the second data includes alert information that is based on the second information.

According to such a configuration, it is possible to cause a device that has received the second data to preferentially perform the danger avoidance processing based on the alert information.

In this case, each of the above sensor data generating device may be configured such that:
  the processor is configured to monitor temporal change of a position of a reference arranged in the second area; and
  the second data includes offset information of the sensor that is based on the temporal change.

According to such a configuration, it is possible to cause a device that has received the second data to recognize the positional deviation of the sensor. For example, when the amount of positional deviation of the sensor indicated by the offset information exceeds a predetermined value, the device can perform processing for notifying the user of the necessity of correcting the sensing reference position of the sensor. The correction of the sensing reference position of the sensor may be performed mechanically or electronically by the device.

Each of the above sensor data generating device may be configured such that the processor is configured to monitor temporal change of a position of a reference arranged in the second area, and to change a position of the first area based on the temporal change.

According to such a configuration, it is possible to automate the correction of the sensing reference position of the sensor while suppressing an increase in the processing load in the device for receiving the second data.

Each of the above sensor data generating device may be configured such that:

the at least one sensor includes a first sensor and a second sensor; and the processor associated one sensor of the first sensor and the second sensor is configured to enlarge the first area of the one sensor based on information indicating abnormality of the other sensor of the first sensor and the second sensor.

According to such a configuration, when any abnormality occurs in one sensor, it is possible to perform processing to compensate for the shortage by the other sensor.

Each of the above sensor data generating device may be configured such that:

the at least one sensor includes a first sensor and a second sensor;

a priority is assigned in accordance with a position in a sensible area of the first sensor and a position in a sensible area of the second sensor; and the processor is configured to generate the first data and the second data so as to include information indicating the priority.

According to such a configuration, it is possible to introduce weighting according to the priorities in at least one of the recognition processing, the determination processing, and the analysis processing executed in a device for receiving the first data and the second data.

Each of the above sensor data generating device may be configured such that a generation frequency of the second data is lower than a generation frequency of the first data.

By reducing the generation frequency of the second data corresponding to the second information having relatively low necessity, the processing load of the processor can be reduced. In addition, the load associated with the communication of the second data outputted from the output interface can be reduced.

Each of the above sensor data generating device may be configured such that the at least one sensor includes at least one of a LiDAR sensor, a camera, and a millimeter wave sensor.

As used herein, the term "driving support" means control processing that at least partially performs at least one of driving operation (steering operation, acceleration, deceleration), monitoring of a driving environment, and backup of driving operation. That is, it includes not only the partial driving support such as braking function for collision avoidance and assisting function for lane-keeping, but also a full self-driving operation.

DESCRIPTION OF EMBODIMENTS

Examples of embodiments will be described below in detail with reference to the accompanying drawings. In each of the drawings used in the following descriptions, the scale is appropriately changed in order to make each of the members have a recognizable size.

Figure 1:
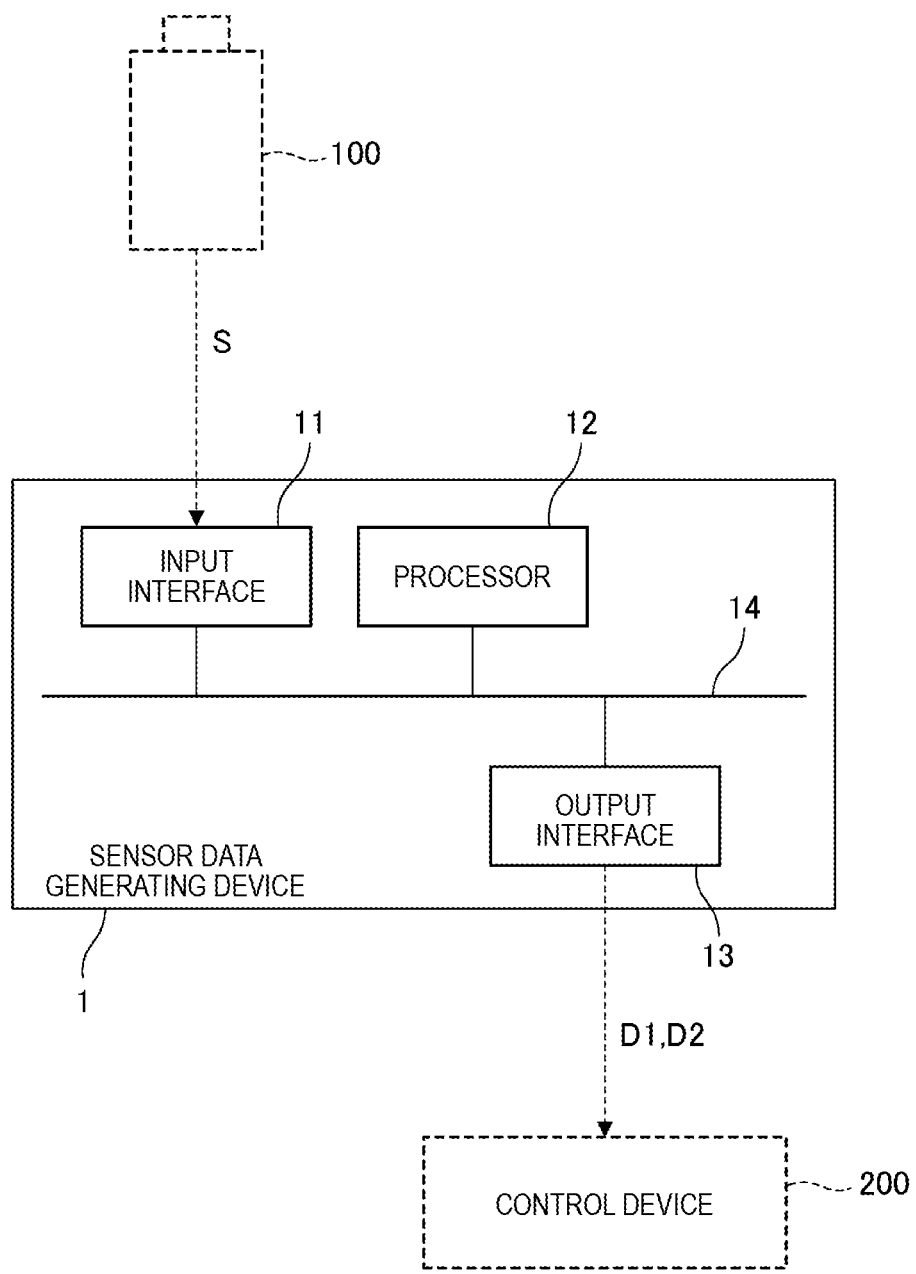
FIG. 1 illustrates one example of a sensor system including a sensor data generating device according to one embodiment.

FIG. 1 schematically illustrates a functional configuration of a sensor data generating device 1 according to an embodiment. The sensor data generating device 1 is mounted on a vehicle. The sensor data generating device 1 constitutes a sensor system together with a camera 100 and a control device 200 mounted on the vehicle.

The camera 100 is a device for acquiring an image of the exterior of the vehicle. The camera 100 may be disposed at an appropriate location inside or outside a compartment of the vehicle. The camera 100 is configured to output a camera signal S corresponding to the acquired image. An image outside the vehicle is an example of the information of the exterior of the vehicle. Acquisition of the image is an example of the sensing of the information. The camera 100 is an example of the sensor. The camera signal S is an example of the sensor signal.

The sensor data generating device 1 includes an input interface 11. The camera signal S outputted from the camera 100 is inputted to the input interface 11.

The sensor data generating device 1 further includes a processor 12, an output interface 13, and a communication bus 14. The input interface 11, the processor 12, and the output interface 13 can exchange signals and data via the communication bus 14. The processor 12 is configured to execute processing illustrated in FIG. 2.

First, the processor 12 acquires the camera signal S inputted to the input interface 11 (STEP1). The expression "acquiring the camera signal S" means that the camera signal S inputted to the input interface 11 is placed in a condition that processing to be described later is made executable with the aid of an appropriate circuit configuration.

Figure 3A:
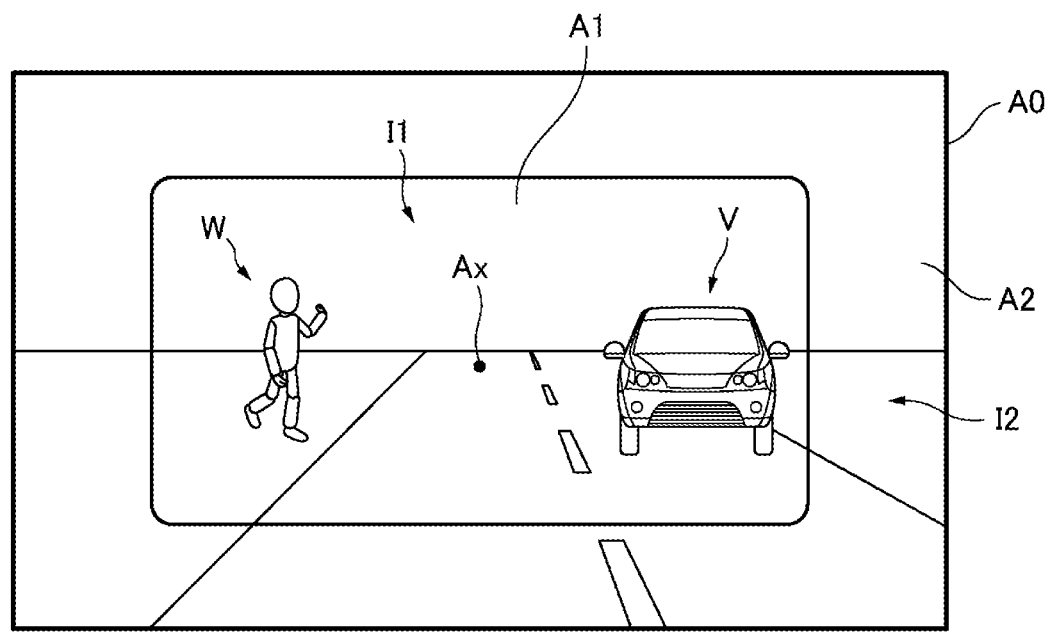
FIG. 3A illustrates an operation of the sensor system illustrated in FIG. 1.

The processor 12 then generates first data D1 based on the camera signal S (STEP2). As illustrated in FIG. 3A, an image-capturable area A0 of the camera 100 includes a first area A1 and a second area A2. The first area A1 is an area including a position corresponding to an optical axis Ax of the camera 100. The second area A2 is an area located outside the first area A1. The second area A2 is an area that does not include a position corresponding to the optical axis Ax of the camera 100. The first data D1 is data corresponding to the first image I1 included in the first area A1. The position corresponding to the optical axis Ax of the camera 100 is an example of the sensing reference position of the sensor. The first image I1 is an example of the first information.

Figure 2:
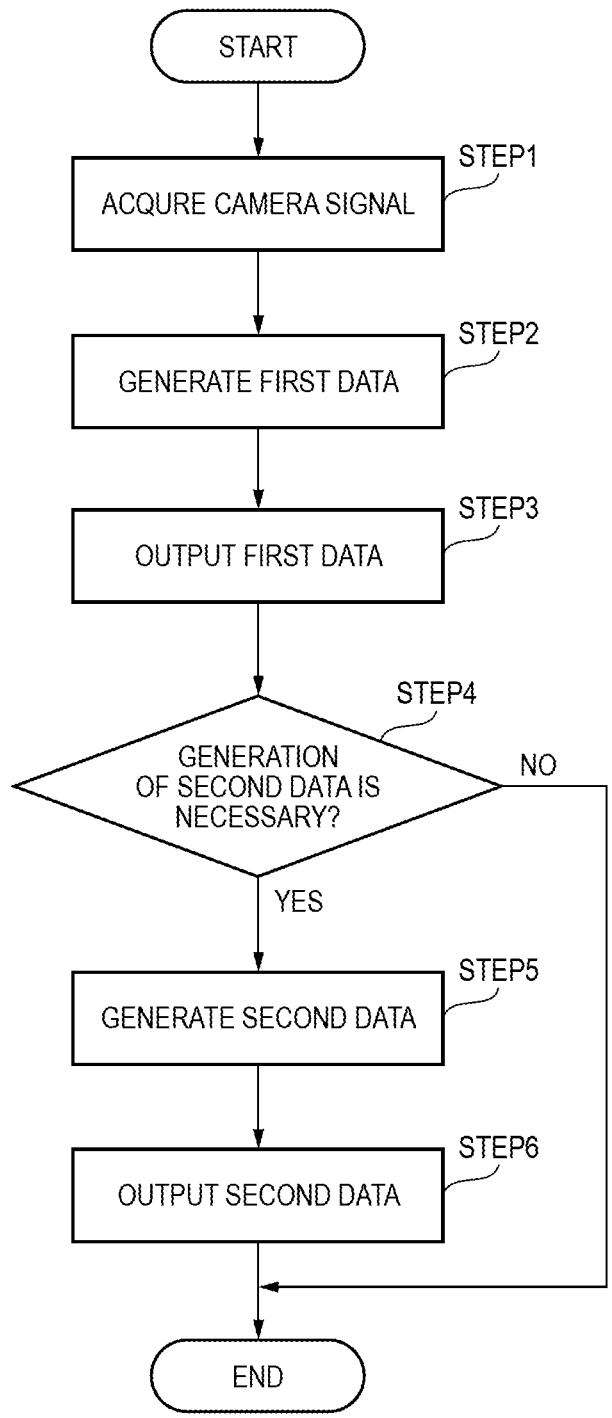
FIG. 2 illustrates an operation flow of the sensor system illustrated in FIG. 1.

Subsequently, as illustrated in FIG. 2, the processor 12 causes the output interface 13 to output the first data D1 (STEP3). The outputted first data D1 is transmitted to the control device 200.

The control device 200 is a device configured to be capable of performing at least one of recognition processing, determination processing, and analysis processing with respect to at least the first data D1. For example, the control device 200 may analyze the first image I1 illustrated in FIG. 3A based on the first data D1 to recognize the presence of an oncoming vehicle V or a walker W.

Subsequently, as illustrated in FIG. 2, the processor 12 determines whether the generation of the second data D2 is necessary (STEP4). The second data D2 is data corresponding to the second image I2 included in the second area A2. The second image I2 is an example of the second information. When it is determined that the generation of the second data D2 is not necessary (N in STEP4), the processing ends.

If it is determined that the generation of the second data D2 is necessary (Y in STEP4), the processor 12 generates the second data D2 based on the camera signal S (STEP5).

Subsequently, the processor 12 causes the output interface 13 to output the second data D2 (STEP6). After the output of the second data D2, the processing ends. The output second data D2 is transmitted to the control device 200. The second data D2 is subjected to predetermined processing in the control device 200.

That is, the output interface 13 is configured to be capable of independently outputting the first data D1 and the second data D2 independently from one another.

It can be said that the first image I1 of the first area A1 including the position corresponding to the optical axis Ax of the camera 100 has higher necessity as information used for driving assistance than the second image I2 of the second area A2 located outside the first area A1. Not only the first data D1 corresponding to the first image I1 but also the second data D2 corresponding to the second image I2 which the camera 100 is capable of acquiring but the necessity is relatively low can be outputted as required, whereby the information acquired by the camera 100 can be utilized in a more effective manner while suppressing load related to data communication.

In STEP5 illustrated in FIG. 2, the processor 12 may generate the second data D2 by adding information related to at least one of recognition, determination, and analysis with respect to the second image I2.

Figure 3B:
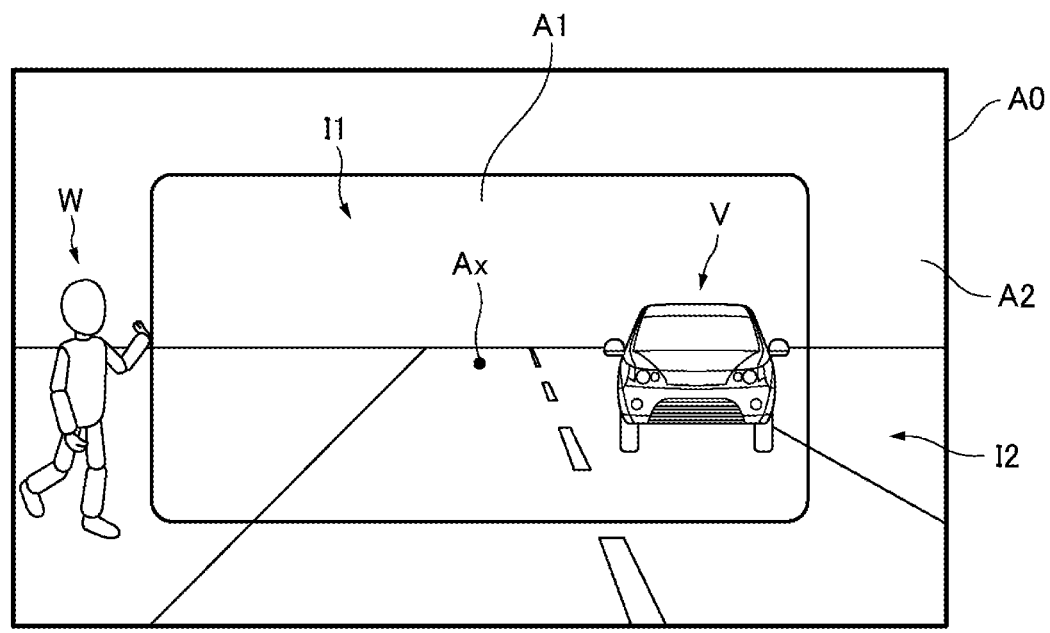
FIG. 3B illustrates an operation of the sensor system illustrated in FIG. 1.

For example, as illustrated in FIG. 3B, when the walker W is located in the second area A2, the control device 200 cannot recognize the walker W by the processing based on the first data D1 corresponding to the first image I1. However, if the processor 12 recognizes the walker W based on the second image I2 and adds the information related to the recognition to the second data D2, the control device 200 receiving the second data D2 can recognize the walker W.

That is, the sensor data generating device 1 does not perform at least one of the recognition processing, the determination processing, and the analysis processing with respect to the first data D1, and prioritizes the promptness to the control device 200 to which the processing based on the first data D1 having higher necessity is entrusted. By narrowing down the object of the above processing to the second image I2, it is possible to provide information that can supplement the processing performed in the control device 200 while suppressing an increase in the processing load of the processor 12.

In this instance, in STEP5 illustrated in FIG. 2, the processor 12 may append alert information based on the second image I2 to the second data D2. For example, when it is determined that the walker W located in the second area A2 recognized by the processing of the processor 12 is about to further enter the roadway, the processor 12 may append alert information to the second data D2. That is, the second data D2 may include alert information based on the second image I2.

According to such a configuration, it is possible to cause the control device 200 that has received the second data D2 to preferentially perform the danger avoidance processing based on the alert information.

Figure 4A:
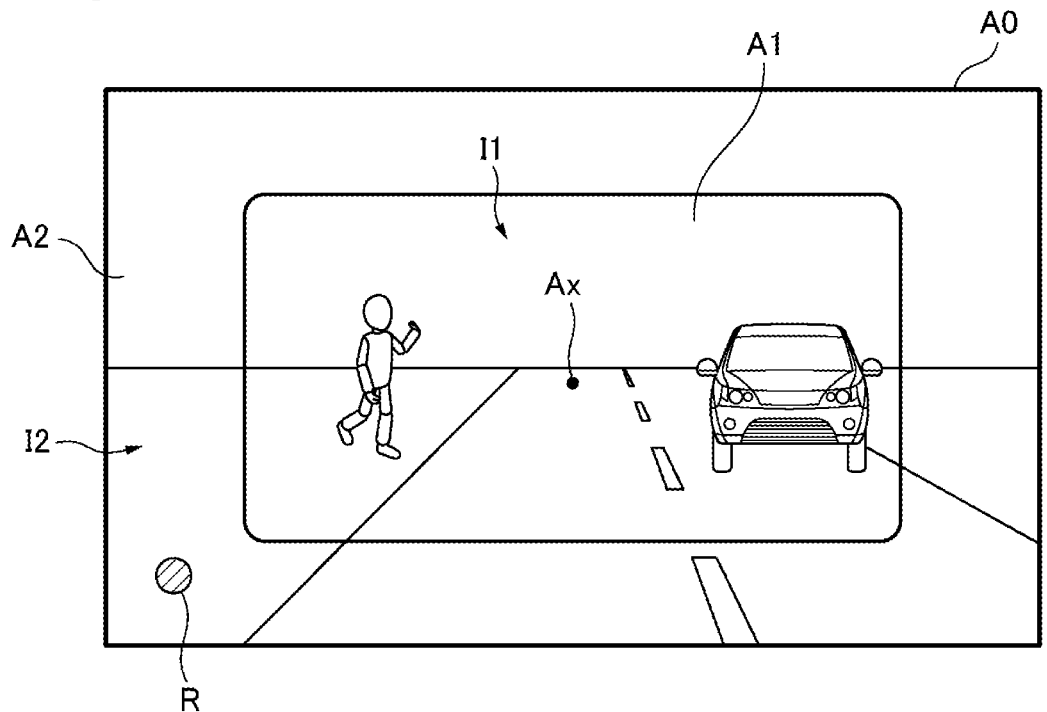
FIG. 4A illustrates an operation of the sensor system illustrated in FIG. 1.

As illustrated in FIG. 4A, a reference R may be arranged in the second area A2. The reference R can be any object or mark that can be image-captured by the camera 100 and whose position does not change. As the reference R, a portion of the vehicle body may be exemplified. In this case, the processor 12 may be configured to monitor the position of the reference R through image recognition processing.

Figure 4B:
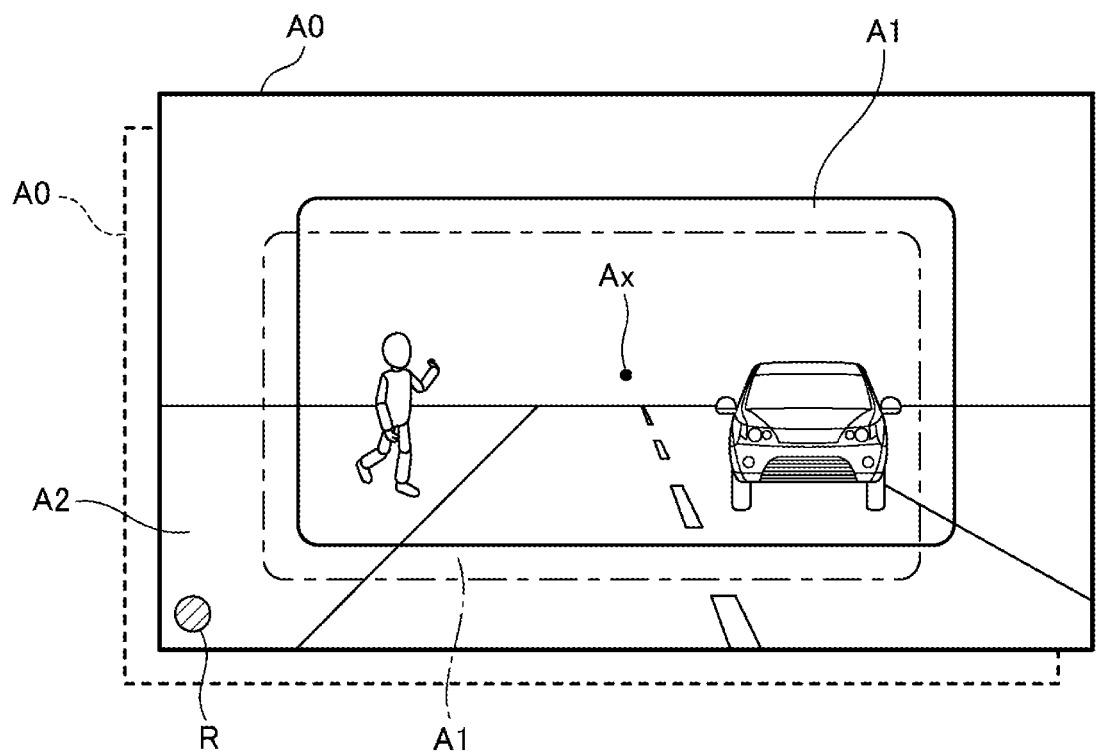
FIG. 4B illustrates an operation of the sensor system illustrated in FIG. 1.

With the lapse of time, at least one of the position and the attitude of the camera 100 relative to the vehicle body may change. As a result, for example, as illustrated in FIG. 4B, the image-capturable area A0 deviates in an upper right direction from the initial position that is indicated by dashed lines, and the position of the reference R in the second area A2 is displaced in a lower left direction. In this instance, in STEP5 illustrated in FIG. 2, the processor 12 may append offset information of the camera 100 to the second data D2 based on the temporal change of the position of the reference R. That is, the second data D2 may include the offset information of the camera 100 based on the temporal change of the position of the reference R.

According to such a configuration, it is possible to cause the control device 200 that has received the second data D2 to recognize the positional deviation of the camera 100. For example, when the amount of positional deviation of the camera 100 indicated by the offset information exceeds a predetermined value, the control device 200 can perform processing for notifying the user of the necessity of correcting the imaging reference position of the camera 100. The imaging reference position of the camera 100 may be mechanically corrected.

When the position of the first area A1 extracted from the image-capturable area A0 can be changed electronically, i.e., so-called electronic aiming is possible, the control device 200 can change the position of the first area A1 in the image-capturable area A0 based on the offset information included in the second data D2. In the case of the example illustrated in FIG. 4B, the position of the current first area A1 indicated by solid lines is changed to the original position of the first area A1 indicated by chain lines. In this case, the correction of the imaging reference position of the camera 100 can be automated.

Alternatively, the processor 12 may change the position of the first area A1 within the image-capturable area A0.

In this case, it is possible to automate the correction of the imaging reference position of the camera 100 while suppressing an increase in the processing load in the control device 200.

Figure 5:
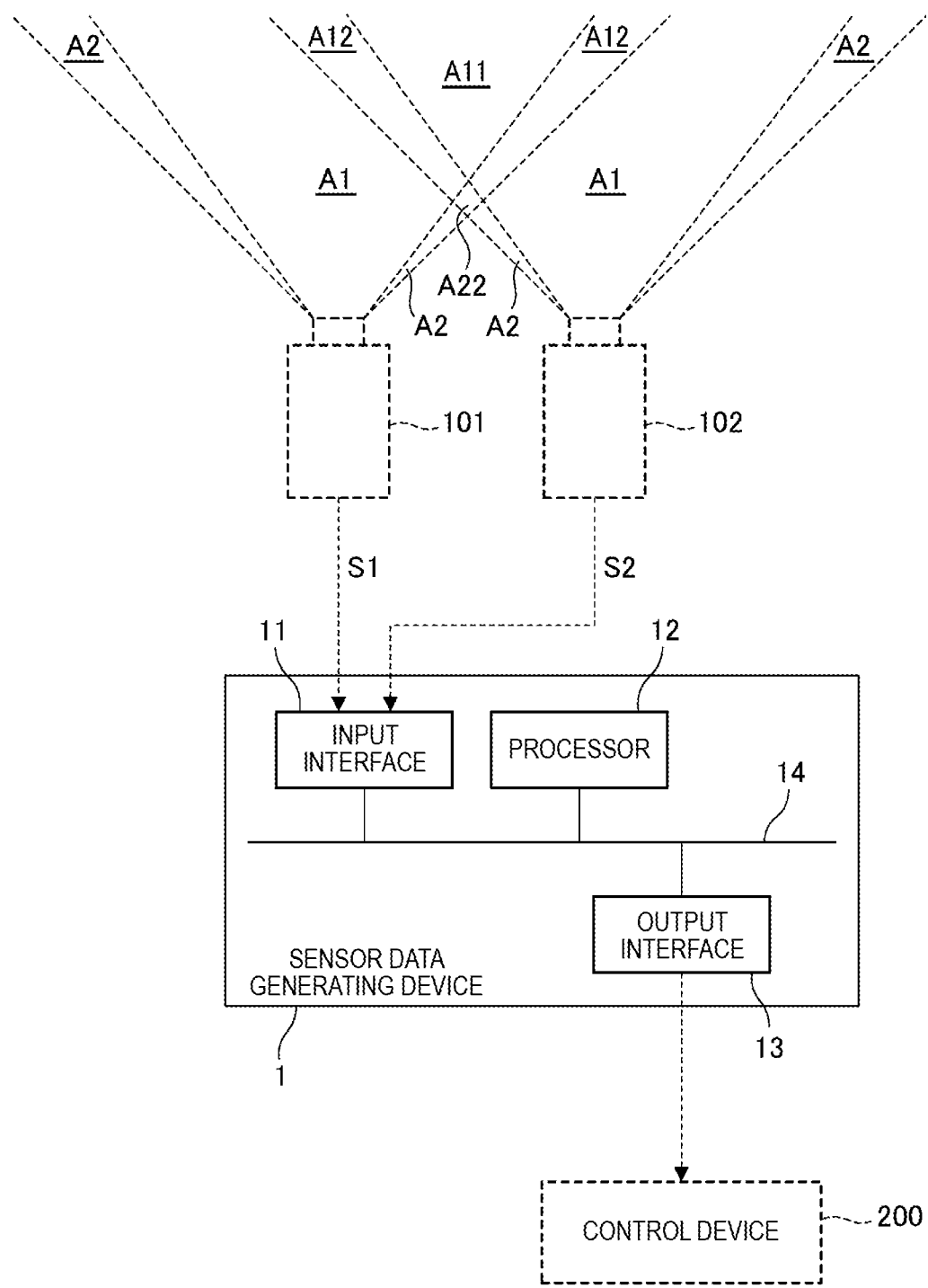
FIG. 5 illustrates another example of a sensor system including the sensor data generating device illustrated in FIG. 1.

FIG. 5 illustrates another configuration of a sensor system using the sensor data generating device 1. In this example, the sensor data generating device 1 constitutes a sensor system together with a first camera 101, a second camera 102, and the control device 200 mounted on the vehicle.

The first camera 101 and the second camera 102 are devices for acquiring images of the exterior of the vehicle. The first camera 101 and the second camera 102 may be disposed at appropriate locations inside or outside a compartment of the vehicle.

The first camera 101 is configured to output a first camera signal S1 corresponding to the acquired image. The second camera 102 is configured to output a second camera signal S2 corresponding to the acquired image. The first camera 101 is an example of the first sensor. The second camera 102 is an example of the second sensor. Each of the first camera signal S1 and the second camera signal S2 is an example of the sensor signal.

Figure 6A:
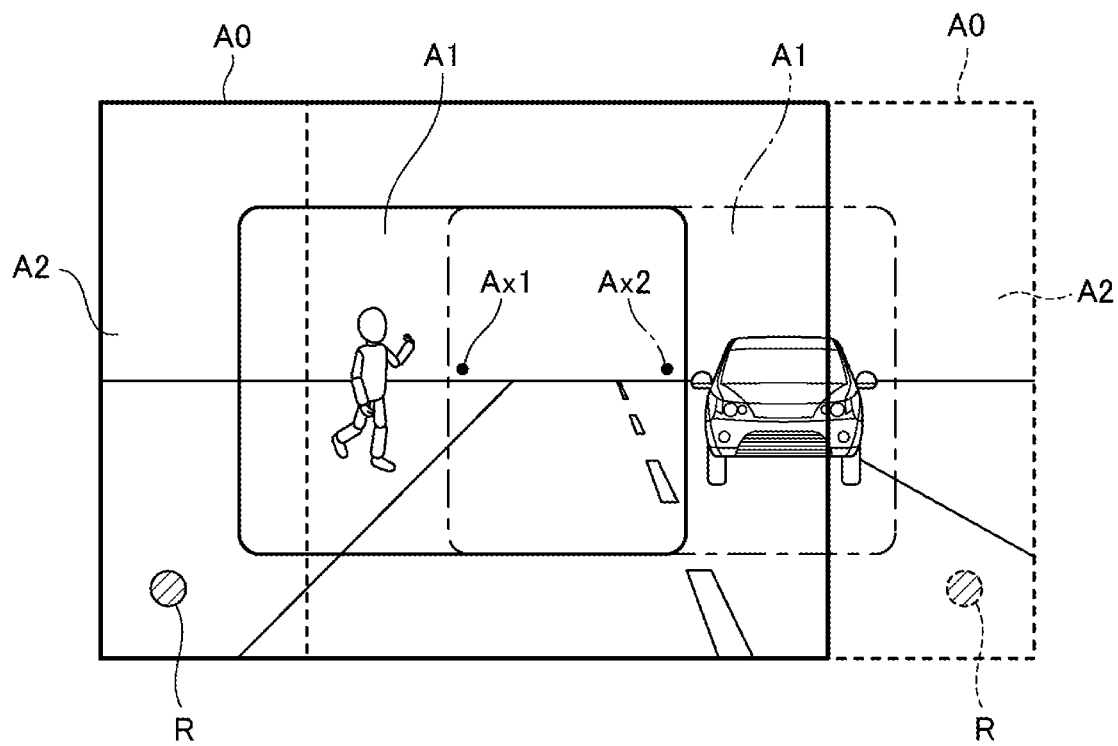
FIG. 6A illustrates an operation of the sensor system illustrated in FIG. 5.

As illustrated in FIG. 5 and FIG. 6A, a first area A1 and a second area A2 are provided for each of the first camera 101 and the second camera 102. The first area A1 of the first camera 101 indicated by solid lines includes a position corresponding to an optical axis Ax1 of the first camera 101. The second area A2 of the first camera 101 indicated by solid lines is an area located outside the first area A1 of the first camera 101. The second area A2 of the first camera 101 does not include a position corresponding to the optical axis Ax1 of the first camera 101. The first area A1 of the second camera 102 indicated by chain lines includes a position corresponding to an optical axis Ax2 of the second camera 102. The second area A2 of the second camera 102 indicated by dashed lines is an area located outside the first area A1 of the second camera 102. The second area A2 of the second camera 102 does not include a position corresponding to the optical axis Ax2 of the second camera 102.

As in the example described with reference to FIG. 4A, the reference R may be arranged in each second area A2 of the first camera 101 and the second camera 102. The processor 12 may be configured to monitor a position of each reference R through image recognition processing.

The image in each image-capturable area A0 changes from moment to moment, but the position and appearance of the reference R basically do not change. Therefore, whether or not each reference R is normally image-captured can be information for determining whether or not the camera monitoring the reference R is normally operating. When the processor 12 determines that one reference R has not been successfully image-captured, it determines that an error has occurred in one camera monitoring the reference R. In that case, the processor 12 enlarges the first area A1 of the other camera.

Figure 6B:
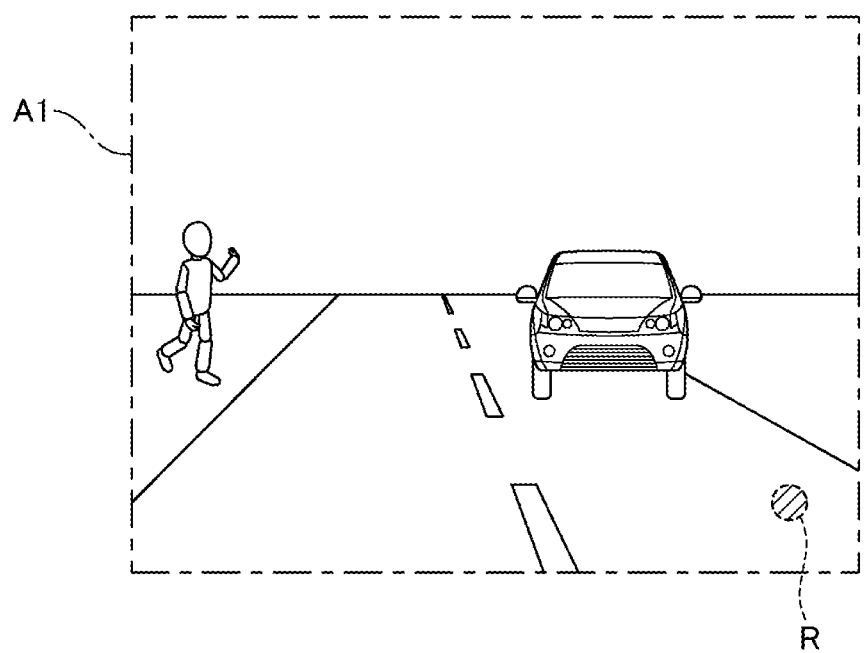
FIG. 6B illustrates an operation of the sensor system illustrated in FIG. 5.

For example, when it is determined that the reference R arranged in the second area A2 of the first camera 101 illustrated in FIG. 6A cannot be image-captured normally, the processor 12 enlarges the first area A1 of the second camera 102 indicated by the chain lines as illustrated in FIG. 6B. In the drawing, the enlargement is performed until a periphery of the first area A1 of the second camera 102 coincides with an original periphery of the second area of the second camera 102 indicated by the dashed lines.

According to such a configuration, when any abnormality occurs in one of the two cameras constituting the sensor system, it is possible to perform processing to compensate for the shortage by the other camera.

In the example illustrated in FIG. 5, both the first camera 101 and the second camera 102 are connected to a single sensor data generating device 1. This example is useful when the first camera 101 and the second camera 102 are mounted in a specific position in a vehicle as a single sensor module housed in a common housing.

Figure 7:
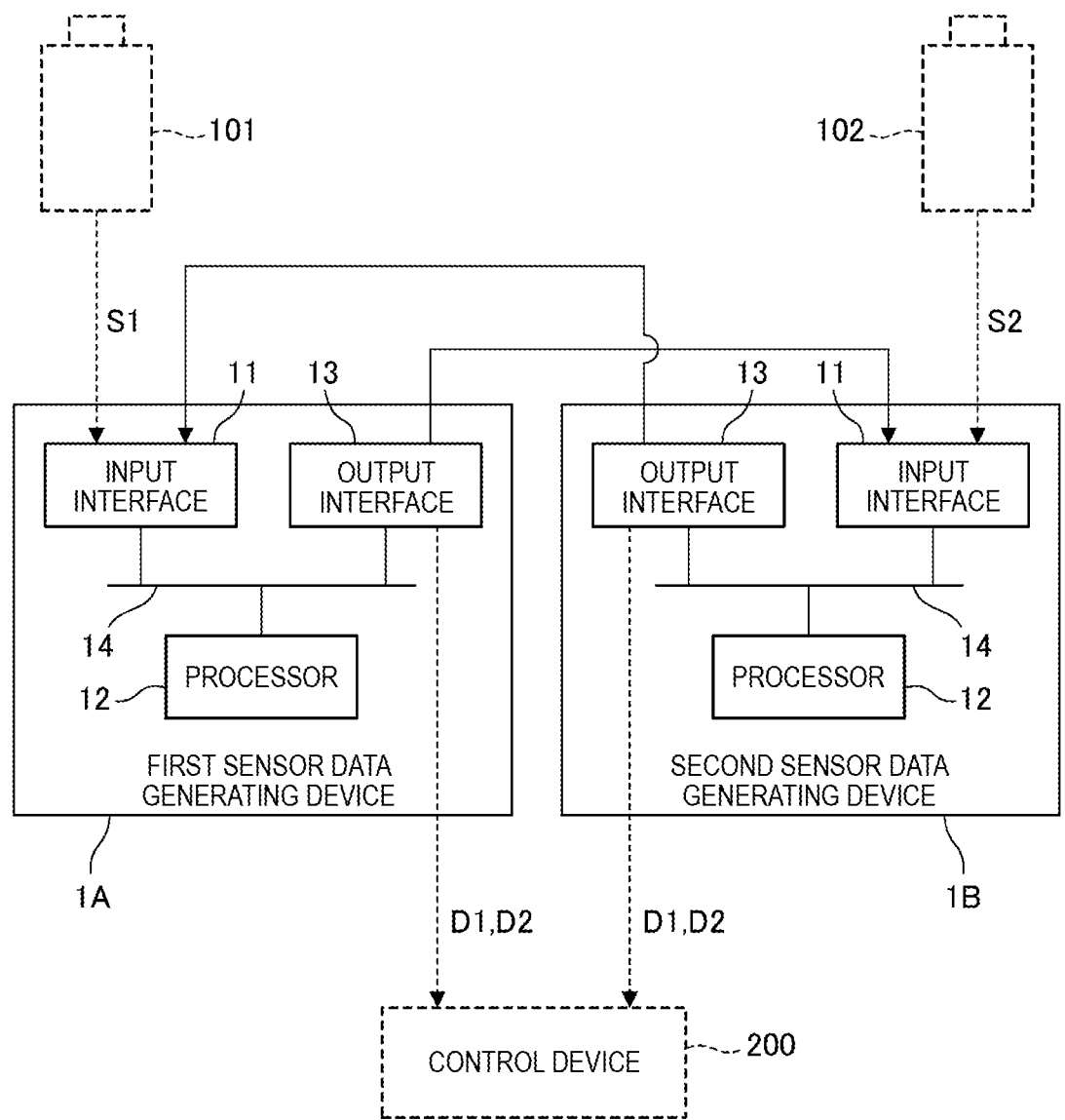
FIG. 7 illustrates another example of a sensor system including the sensor data generating device illustrated in FIG. 1.

FIG. 7 shows another embodiment in which a sensor system is configured by a first sensor data generating device 1A, a second sensor data generating device 1B, the first camera 101, the second camera 102, and the control device 200. The configuration of each of the first sensor data generating device 1A and the second sensor data generating device 1B is identical with the configuration of the sensor data generating device described above. The first camera 101 is connected to the first sensor data generating device 1A. The second camera 102 is connected to the second sensor data generating device 1B. The first data D1 and the second data D2 outputted from the output interface 13 of each of the first sensor data generating device 1A and the second data generating device 1B are transmitted to the common control device 200. This embodiment is useful when a first sensor module including the first camera 101 and the first sensor data generating device 1A and a second sensor module including the second camera 102 and the second sensor data generating device 1B are mounted at two distant locations in the vehicle.

In this example, when determining an error of the first camera 101, the processor 12 of the first sensor data generating device 1A transmits the information indicating the error to the second sensor data generating device 1B via the output interface 13. The information is inputted to the input interface 11 of the second sensor data generating device 1B. Similarly, when determining the error of the second camera 102, the processor 12 of the second sensor data generating device 1B transmits the information indicating the error to the first sensor data generating device 1A via the output interface 13. The information is inputted to the input interface 11 of the first sensor data generating device 1A.

When the processor 12 of the second sensor data generating device 1B acquires the information indicating the abnormality of the first camera 101, the processor 12 executes processing for enlarging the first area A1 of the second camera 102. Similarly, when the processor 12 of the first sensor data generating device 1A acquires the information indicating the abnormality of the second camera 102, the processor 12 executes processing for enlarging the first area A1 of the first camera 101.

In the example illustrated in FIG. 5, the image-capturable area A0 of the first camera 101 partially overlaps with the image-capturable area A0 of the second camera 102. As a result, an area A11, an area A12, and an area A22 are defined. The area A11 is an area where the first area A1 of the first camera 101 and the first area A1 of the second camera 102 overlap. The area A12 is an area where the first area A1 of one camera and the second area A2 of the other camera overlap. The area A22 is an area where the second area A2 of the first camera 101 and the second area A2 of the second camera 102 overlap.

In this case, priorities may be assigned according to the positions of the first area A1 of the first camera 101, the second area A2 of the first camera 101, the first area A1 of the second camera 102, and the second area A2 of the second camera 102.

For example, a priority S is assigned to the first area A11. A priority A is assigned to the first area A1 of each camera. A priority B is assigned to the area A12. A priority C is assigned to the second area A22. A priority D is assigned to the second area A2 of each camera. The priority S is higher than the priority A. The priority A is higher than the priority B. The priority B is higher than the priority C. The priority C is higher than the priority D.

The processor 12 may be configured to generate the first data D1 and the second data D2 so as to include information indicating the priority. For example, information indicating the priority S is appended to the first data D1 corresponding to the image included in the first area A11. Information indicating the priority D is appended to the second data D2 corresponding to the image included in the second area A2 of the second camera 102.

According to such a configuration, it is possible to introduce weighting according to the priorities in at least one of the recognition processing, the determination processing, and the analysis processing executed in the control device 200. As an example, when data indicating conflicting information are inputted, data to which information indicating a higher priority is appended may be preferentially processed. As another example, there may be configured such that data with lower priority requires more repetitive inputs of data to confirm the existence of a fact.

Such a configuration is also applicable to the sensor system illustrated in FIG. 7. That is, the processor 12 of the first sensor data generating device 1A can generate the first data D1 and the second data D2 so as to include the information indicating the priority assigned according to the position in the image-capturable area A0 of the first camera 101. Similarly, the processor 12 of the second sensor data generating device 1B may generate the first data D1 and the second data D2 so as to include the information indicating the priority assigned according to the position in the image-capturable area A0 of the second camera 102.

The STEP5 of the second data D2 illustrated in FIG. 2 may be performed each time the first data D1 is generated. However, it is preferable that the frequency at which the second data D2 is generated is lower than the frequency at which the first data D1 is generated.

By reducing the generation frequency of the second data D2 corresponding to the second image I2 having relatively low necessity, the processing load of the processor 12 can be reduced. In addition, the load associated with the communication of the second data D2 outputted from the output interface 13 can be reduced.

The functions of the processor 12 described above may be implemented by a general-purpose microprocessor operating in conjunction with a general-purpose memory. A CPU, an MPU, and a GPU may be exemplified as the general-purpose microprocessor. The general-purpose microprocessor may include multiple processor cores. A ROM and a RAM may be exemplified as the general-purpose memory. The ROM can store a program for executing the processing described above. The program may include an artificial intelligence program. An example of the artificial intelligence program may include a learned neural network with deep learning. The general-purpose microprocessor can specify at least a portion of the program stored in the ROM, load the program on the RAM, and execute the processing described above in cooperation with the RAM. Alternatively, the functions of the processor 12 described above may be implemented by a dedicated integrated circuit such as a micro-controller, an FPGA, and an ASIC.

The above embodiments are merely examples for facilitating understanding of the gist of the presently disclosed subject matter. The configuration according to each of the above embodiments can be appropriately modified or improved without departing from the gist of the presently disclosed subject matter.

In each of the above examples, the entire first area A1 is surrounded by the second area A2, so that the second area A2 is located outside the first area A1. However, the second area A2 may be positioned so as to contact at least a portion of the periphery of the first area A1 as long as the second area A2 has a portion closer to the periphery of the image-capturable area A0 than the first area A1.

The generation of the second data D2 is not necessarily performed on the entire second area A2. That is, the second data D2 may be generated as data corresponding to the second image I2 included in at least a portion of the second area A2.

The camera 100, the first camera 101, and the second camera 102 described above can be replaced by a LiDAR (Light Detection and Ranging) sensor or a millimeter wave sensor, respectively.

The LiDAR sensor may have a configuration for emitting non-visible light and a configuration for sensing returned light as a result of the non-visible light being reflected by at least an object existing outside the vehicle. As required, the LiDAR sensor may include a scan device that sweeps the non-visible light to change the light emitting direction (i.e., the sensing direction). For example, infrared light having a wavelength of 905 nm is used as the non-visible light.

The LiDAR sensor can obtain the distance to the object associated with the returned light, for example, based on the time period from the time when the non-visible light is emitted in a certain direction to the time when the returned light is sensed. Further, by accumulating such distance data in association with the sensing position, it is possible to obtain information as to the shape of the object associated with the returned light. Additionally or alternatively, information as to an attribute such as the material of the object associated with the returned light can be obtained based on the difference in wavelength between the emitted light and the returned light.

The millimeter wave sensor may have a configuration for transmitting a millimeter wave and a configuration for receiving a reflected wave as a result of the millimeter wave being reflected by an object existing outside of the vehicle. Examples of frequencies of the millimeter wave include 24 GHz, 26 GHz, 76 GHz, 79 GHz, etc. The millimeter wave sensor can obtain the distance to the object associated with the reflected wave, for example, based on the time period from the time when the millimeter wave is transmitted in a certain direction to the time when the reflected wave is received. Further, by accumulating such distance data in association with the sensing position, it is possible to obtain information as to the shape of the object associated with the reflected wave.

The present application is based on Japanese Patent Application No. 2018-095396 filed on May 17, 2018, the entire contents of which are incorporated herein by reference.

The invention claimed is:

1. A sensor data generating device adapted to be mounted on a vehicle, comprising:
   an input interface configured to receive at least one sensor signal corresponding to information of the exterior of the vehicle sensed by at least one sensor;
   a processor configured to, based on the sensor signal, generate: a first data corresponding to first information sensed in a first area; and a second data corresponding to second information sensed in a second area located outside the first area; and
   an output interface configured to output the first data and the second data independently from one another,
   wherein the at least one sensor includes a first sensor and a second sensor;
   wherein a priority is assigned in accordance with a position in a sensible area of the first sensor and a position in a sensible area of the second sensor; and
   wherein the processor is configured to generate the first data and the second data so as to include information indicating the priority.

2. A sensor data generating device adapted to be mounted on a vehicle, comprising:
   an input interface configured to receive at least one sensor signal corresponding to information of the exterior of the vehicle sensed by at least one sensor;
   a processor configured to, based on the sensor signal, generate: a first data corresponding to first information sensed in a first area including a sensing reference position of the sensor; and a second data corresponding to second information sensed in a second area not including the sensing reference position; and an output interface configured to output the first data and the second data independently from one another, wherein the at least one sensor includes a first sensor and a second sensor;

wherein a priority is assigned in accordance with a position in a sensible area of the first sensor and a position in a sensible area of the second sensor; and wherein the processor is configured to generate the first data and the second data so as to include information indicating the priority.

\* \* \* \* \*